United States Patent [19]

Lebrun et al.

[11] Patent Number: 4,940,499

[45] Date of Patent: Jul. 10, 1990

[54] METHOD AND APPARATUS FOR SEALING CAPSULES CONTAINING MEDICAMENTS

[75] Inventors: Jean C. Lebrun; Jeffrey L. Kaltz, both of Greenwood; Pressley A. Love, Ninety Six, all of S.C.

[73] Assignee: Warner-Lambert Company, Morris Plains, N.J.

[21] Appl. No.: 356,046

[22] Filed: May 23, 1989

[51] Int. Cl.⁵ .............................................. B65B 7/28
[52] U.S. Cl. ....................................... 156/69; 53/471; 53/900; 118/24; 118/300; 156/285; 156/294; 156/305; 156/382; 156/390; 206/530; 427/3; 428/916
[58] Field of Search ......................... 53/471, 485, 900; 118/24, 300, 324; 156/69, 294, 305, 285, 382, 390; 206/528, 530; 427/3; 428/916

[56] References Cited

U.S. PATENT DOCUMENTS

| | | | |
|---|---|---|---|
| 3,078,629 | 2/1963 | Besemer et al. | 53/471 |
| 3,871,295 | 3/1975 | Ackley | 198/380 X |
| 4,104,966 | 8/1978 | Ackley et al. | 198/380 X |
| 4,266,477 | 5/1981 | Ackley | 198/384 X |
| 4,327,825 | 5/1982 | Ackley et al. | 198/380 |
| 4,372,437 | 2/1983 | Ackley et al. | 198/380 |
| 4,522,666 | 6/1985 | Wittwer | 156/69 |
| 4,539,060 | 9/1985 | Wittwer et al. | 156/305 X |
| 4,656,066 | 4/1987 | Wittwer | 156/305 X |
| 4,734,149 | 3/1988 | Brown | 156/69 X |
| 4,820,364 | 4/1989 | Graham | 156/69 |

Primary Examiner—Robert A. Dawson
Attorney, Agent, or Firm—Daniel A. Scola, Jr.

[57] ABSTRACT

Method and apparatus for sealing gelatin capsules having cylindrical cap and body portions arranged in telescoping relationship to contain a medicament therein comprising a capsule-sealing machine for continuously conveying capsules from a supply hopper to a capsule-rectification station wherein the capsules are reoriented and delivered in endwise, cap-down abutment to capsule-wetting stations where a suitable sealing liquid is applied to the capsules at the seams of their cap and body portions to be located between the overlapping side walls of the cap and body portions of the capsules, and wherein the capsules are conveyed from their wetting stations in peripheral pockets of a rotating drum dryer to a capsule heating and sealing section where the capsules are heated by convection and conduction to seal the cap and body portions.

13 Claims, 10 Drawing Sheets

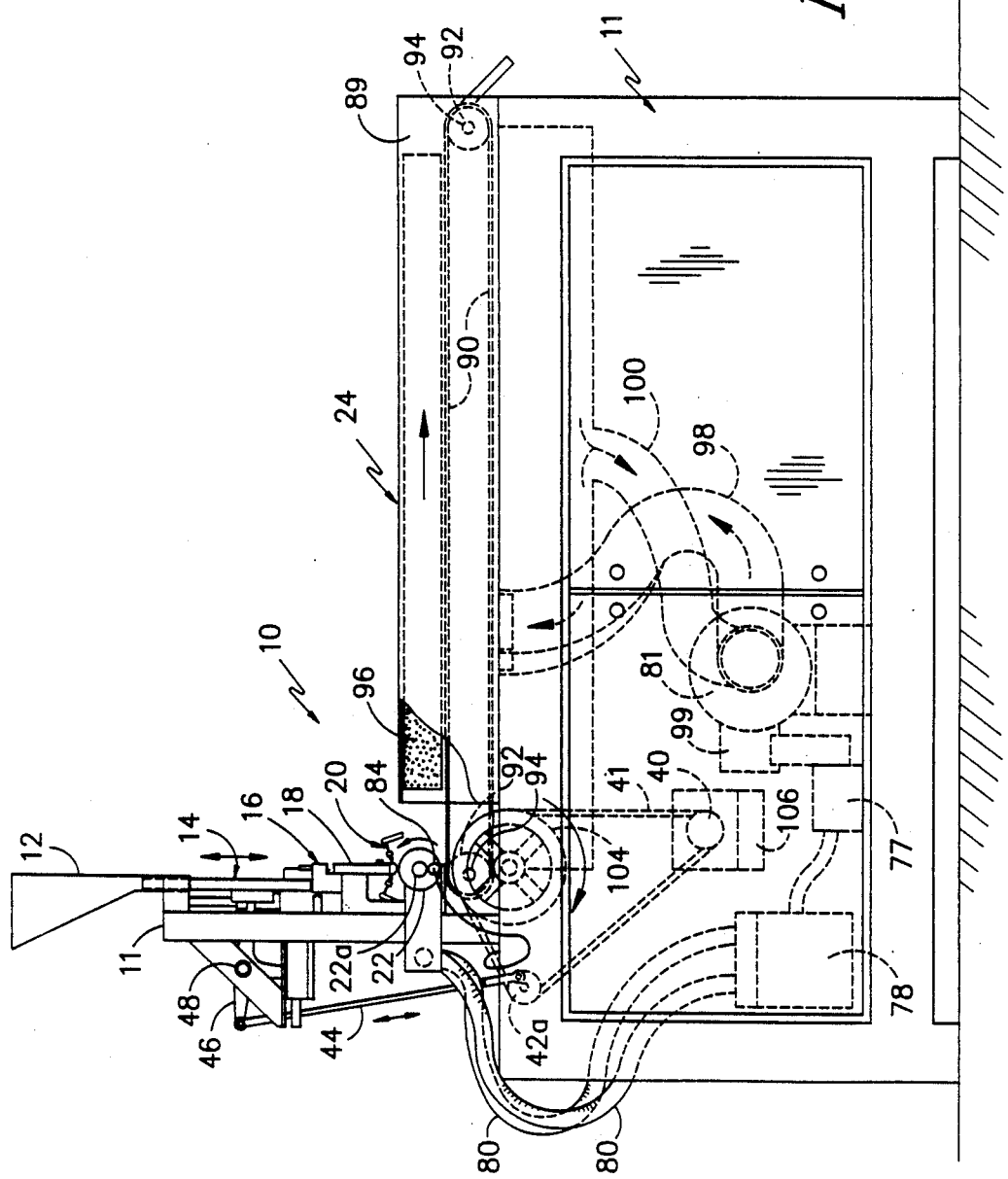
FIG. -1-

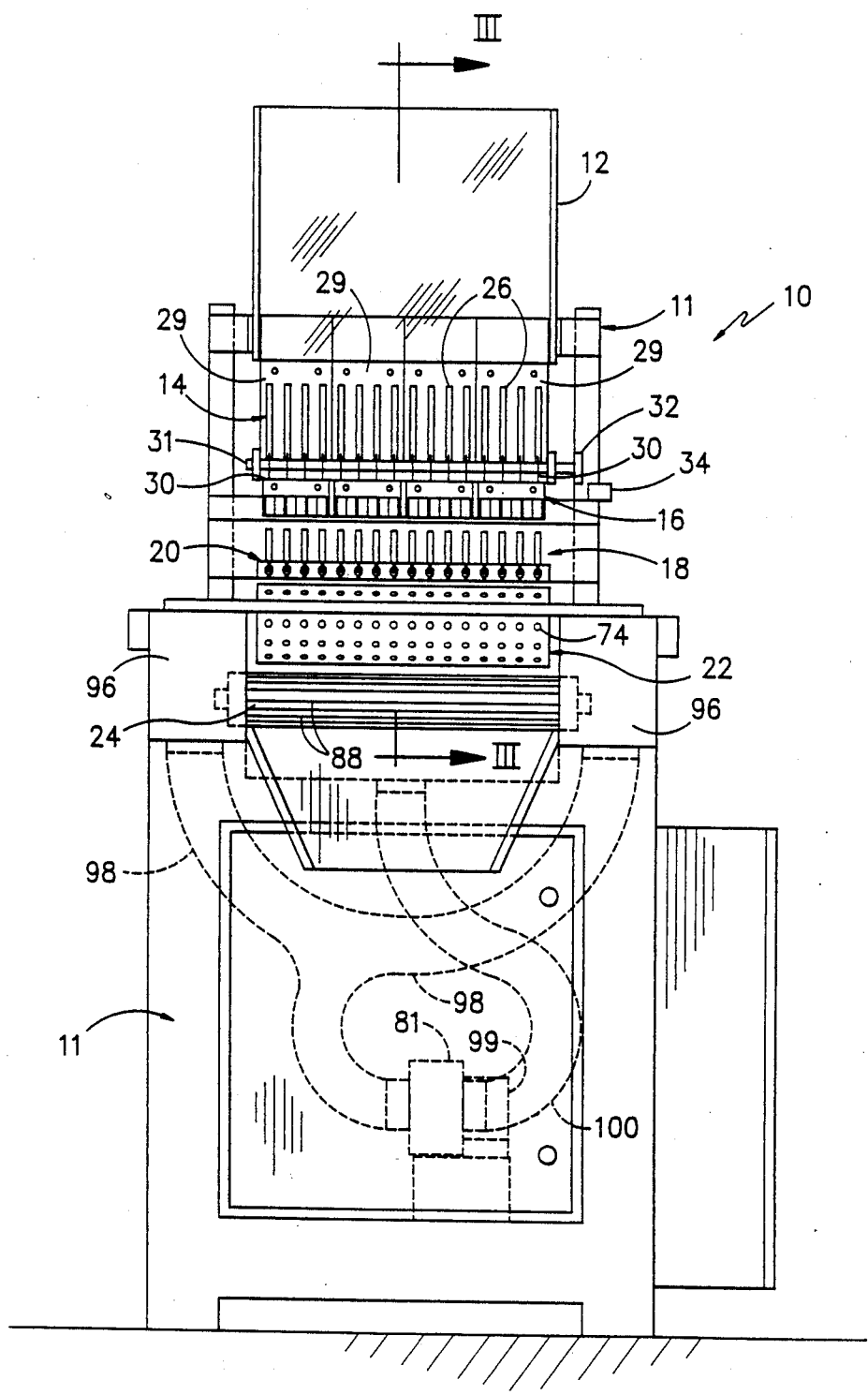
FIG. -2-

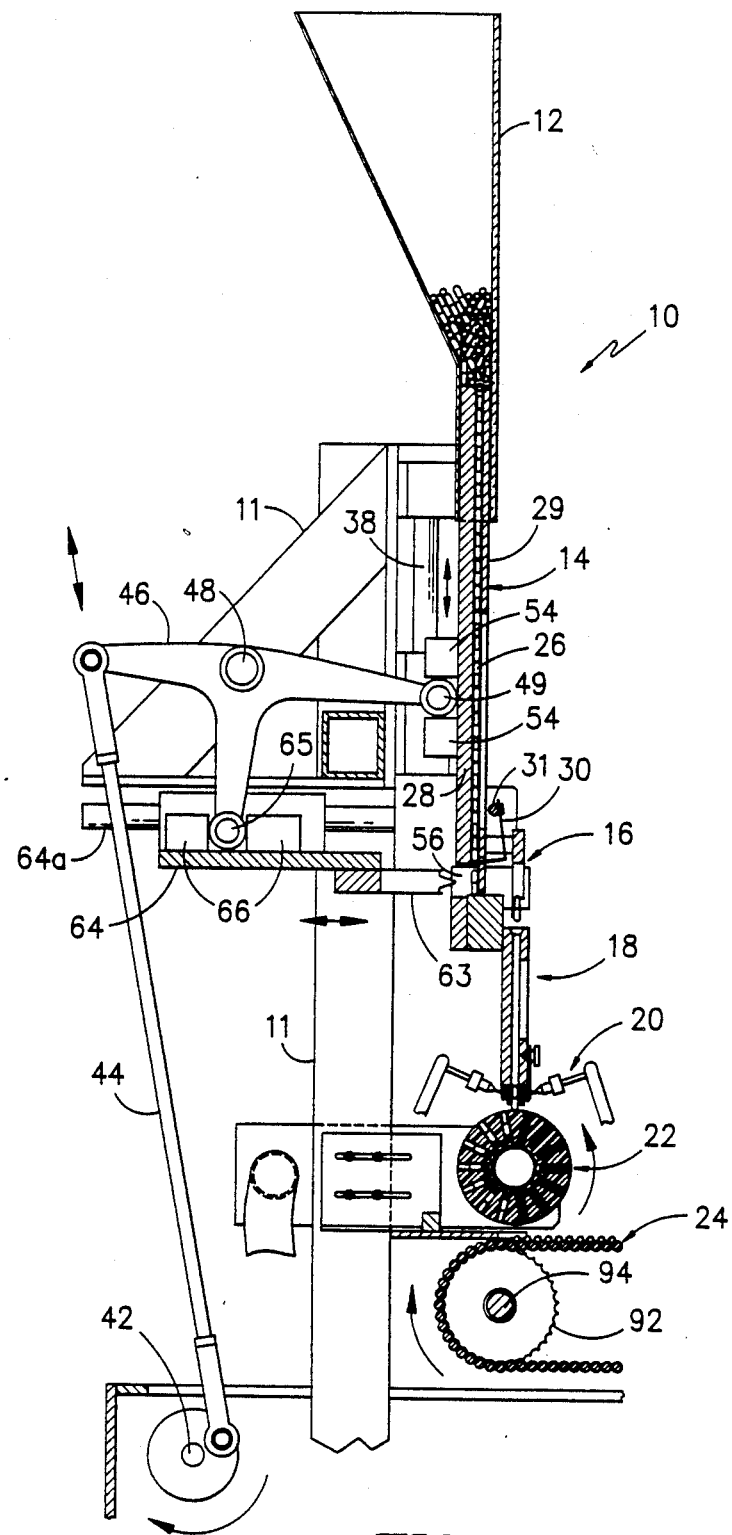
FIG. -3-

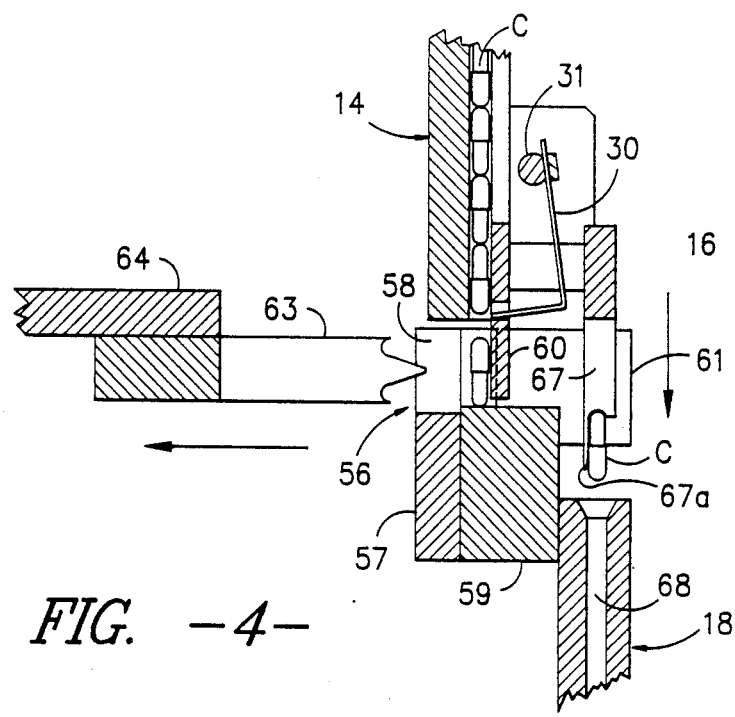
FIG. -4-
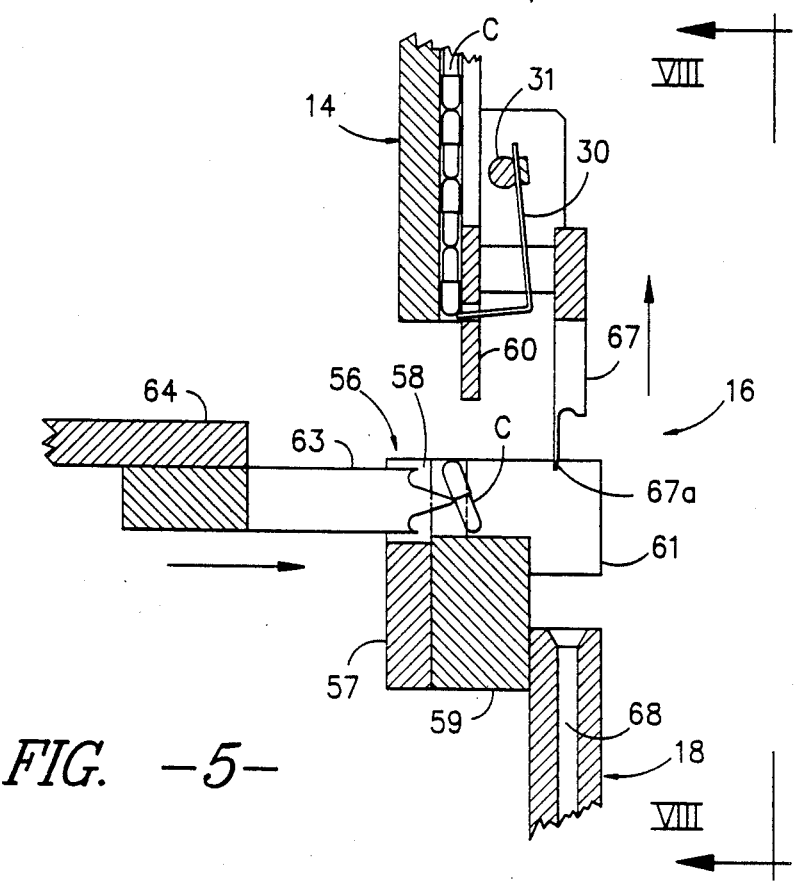
FIG. -5-

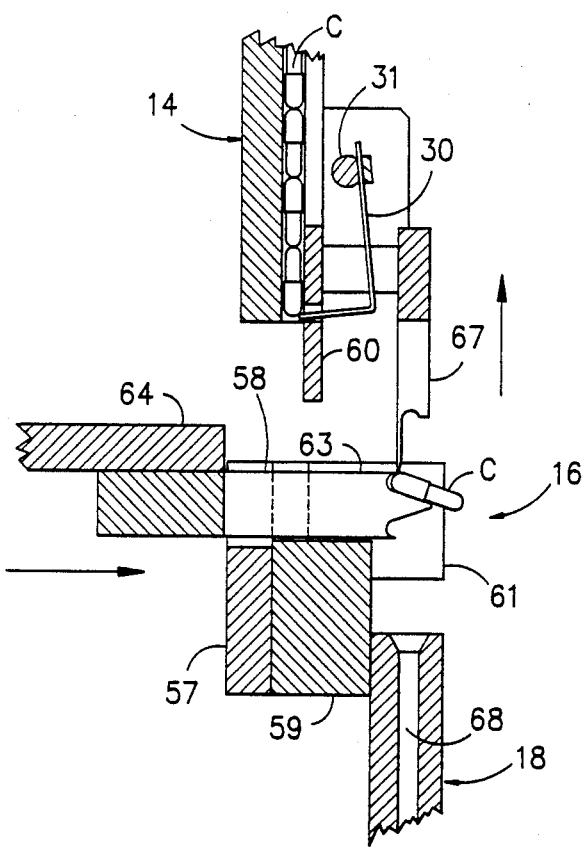
FIG. -6-
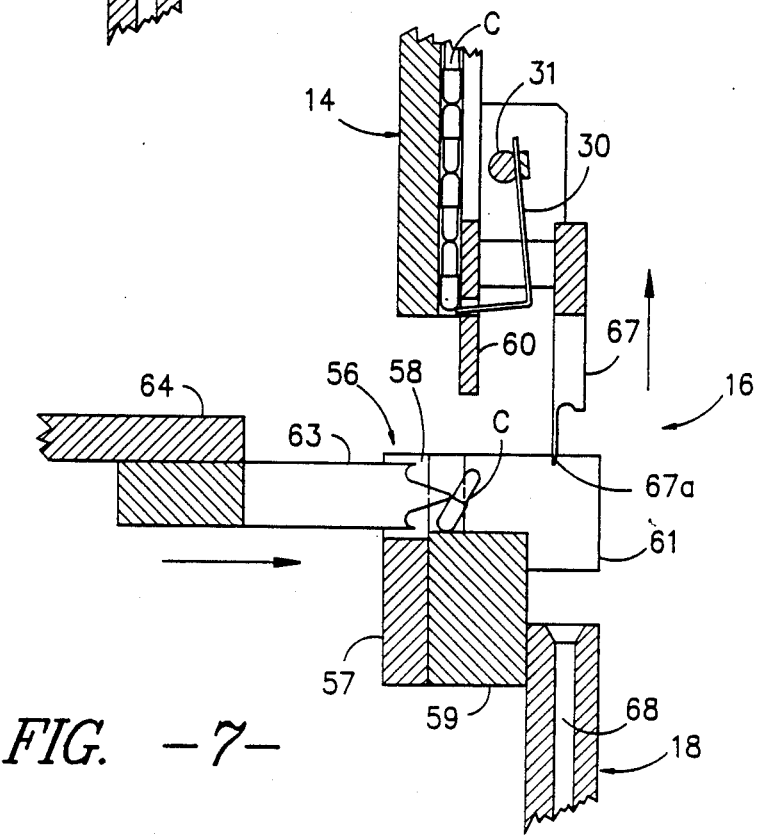
FIG. -7-

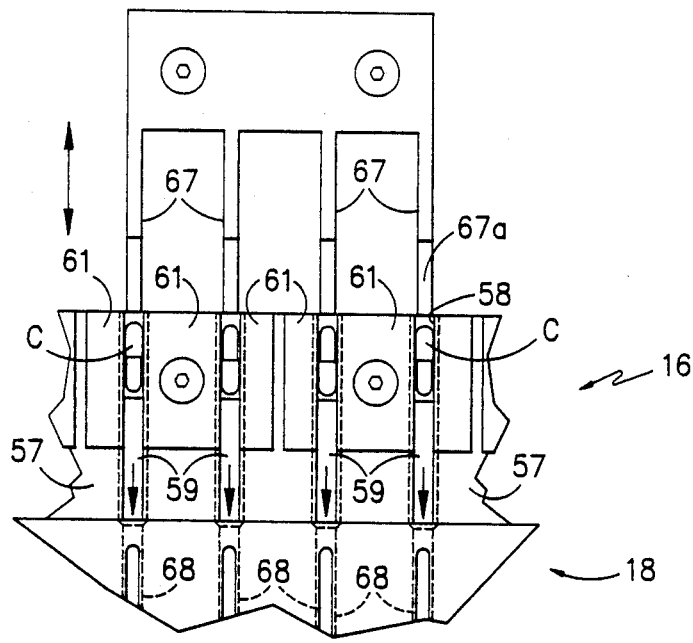
FIG. -8-
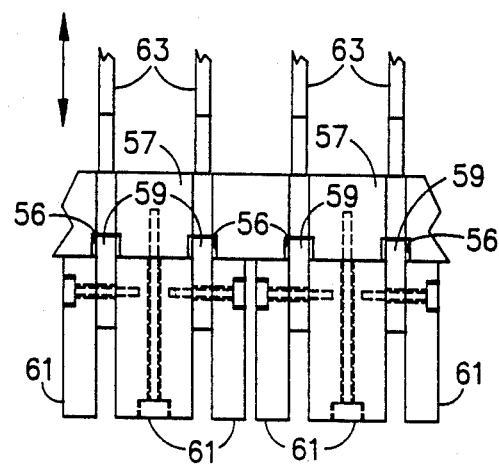
FIG. -9-

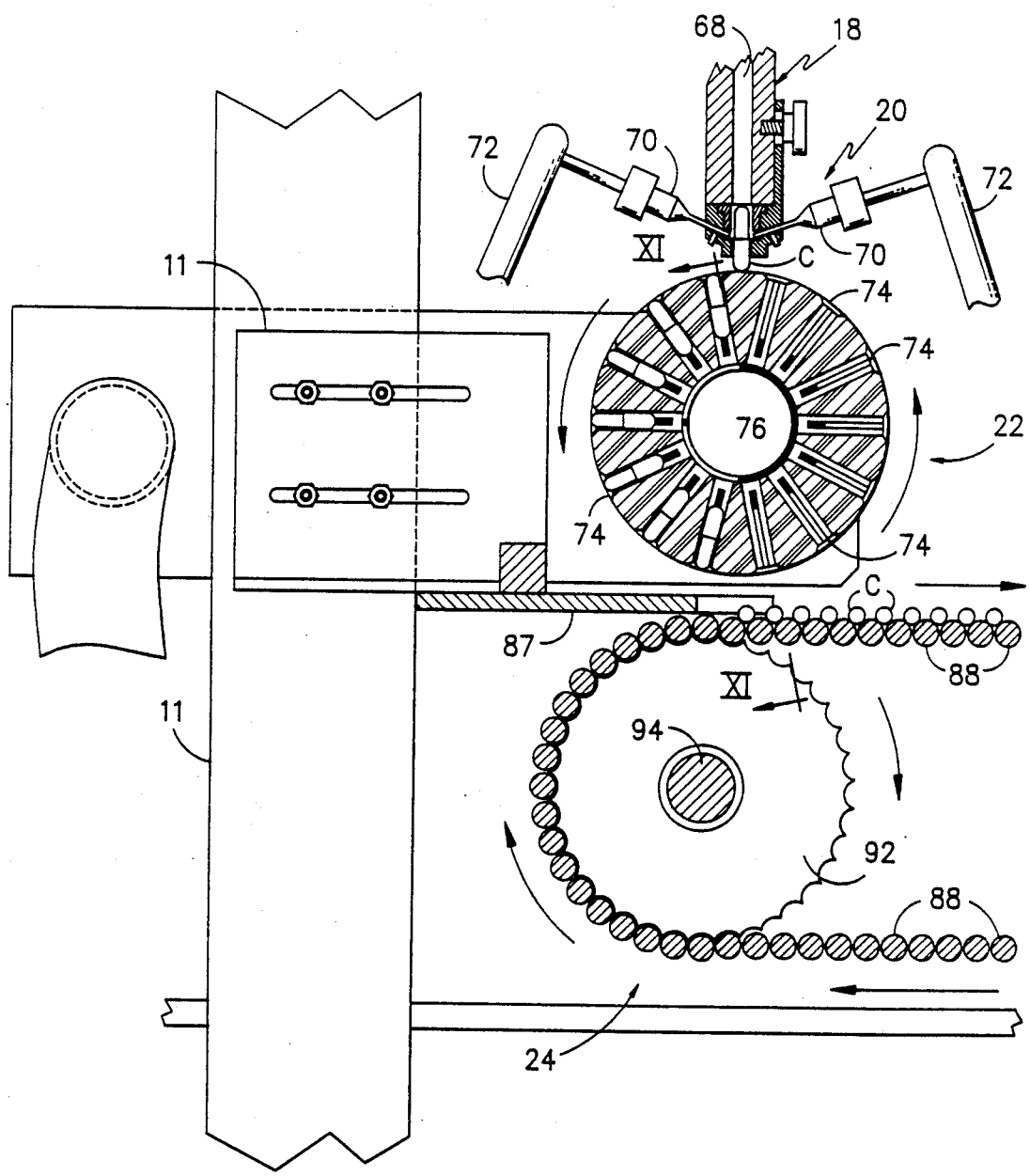
FIG. -10-

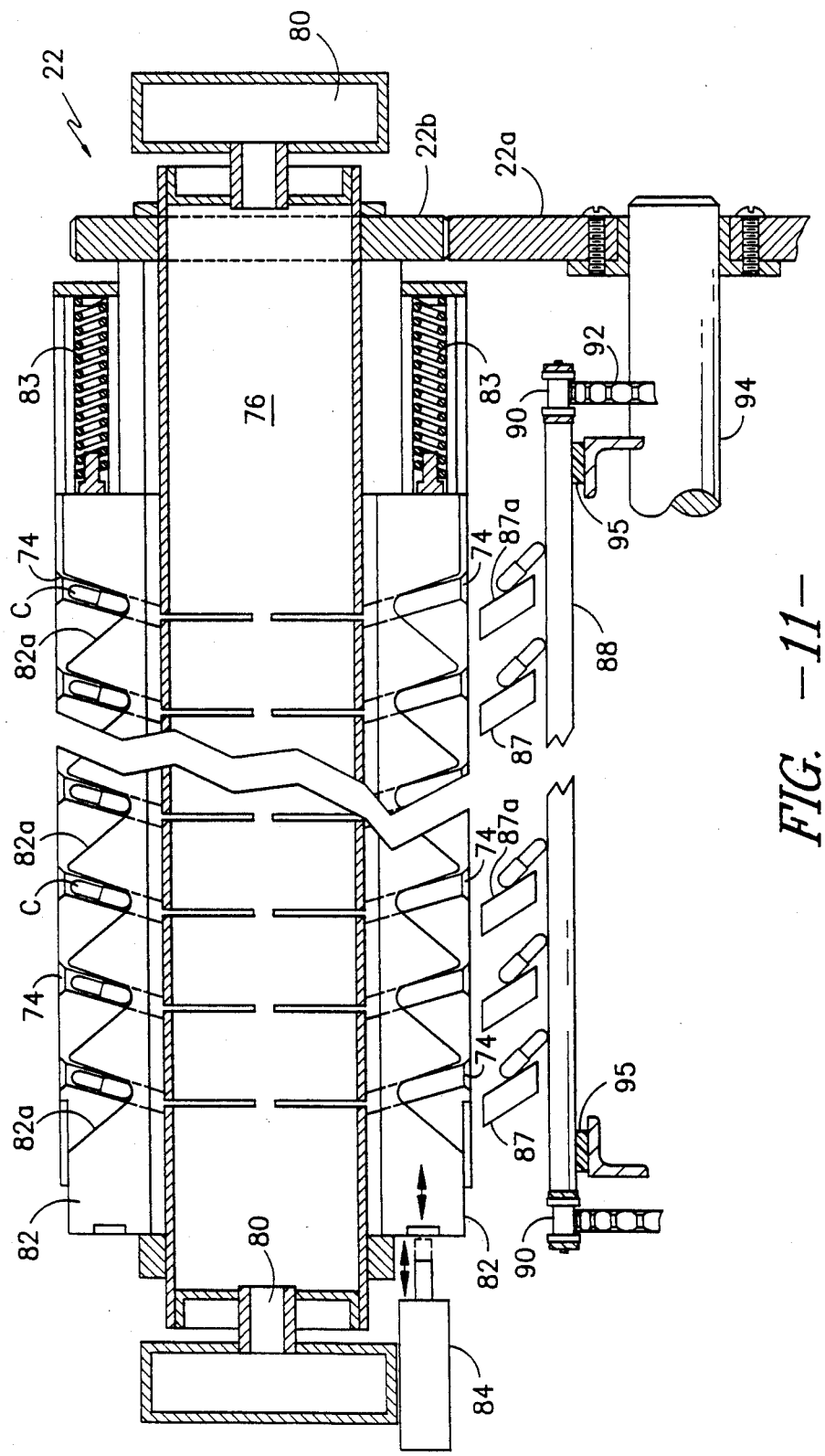
FIG. -11-

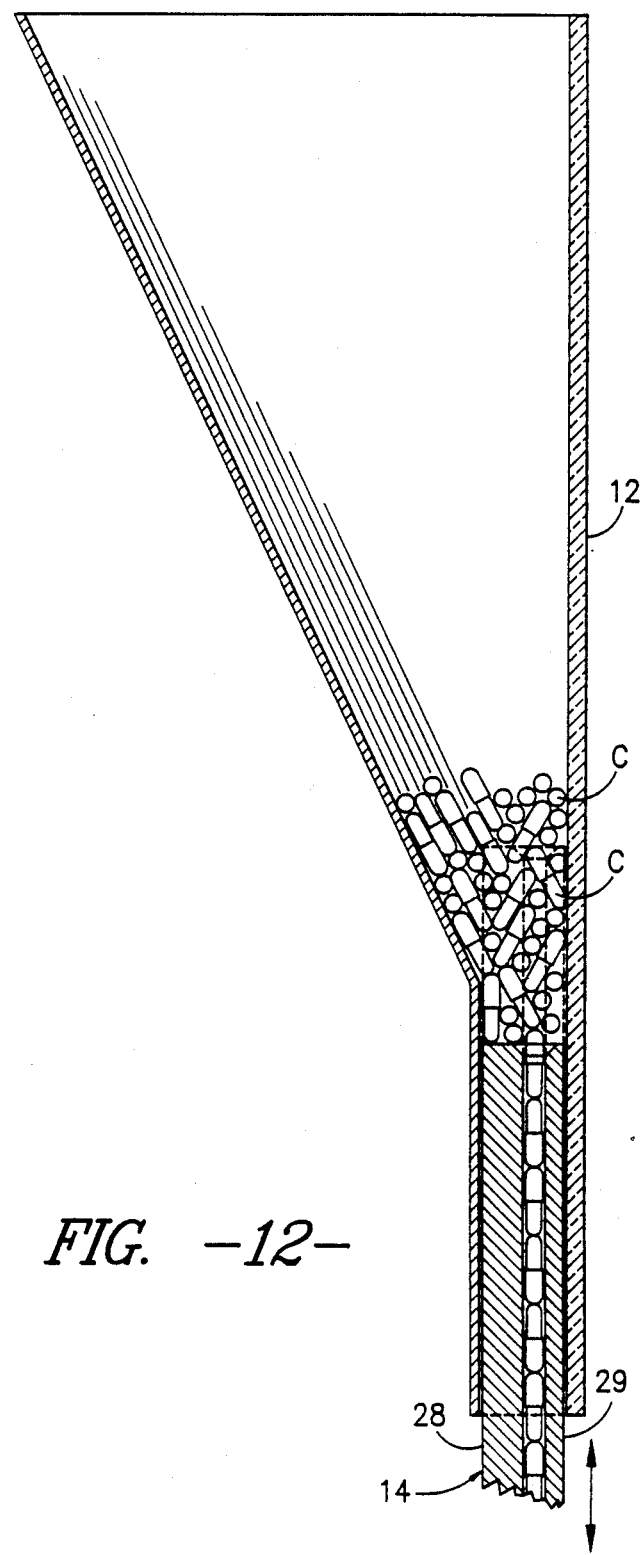
FIG. -12-

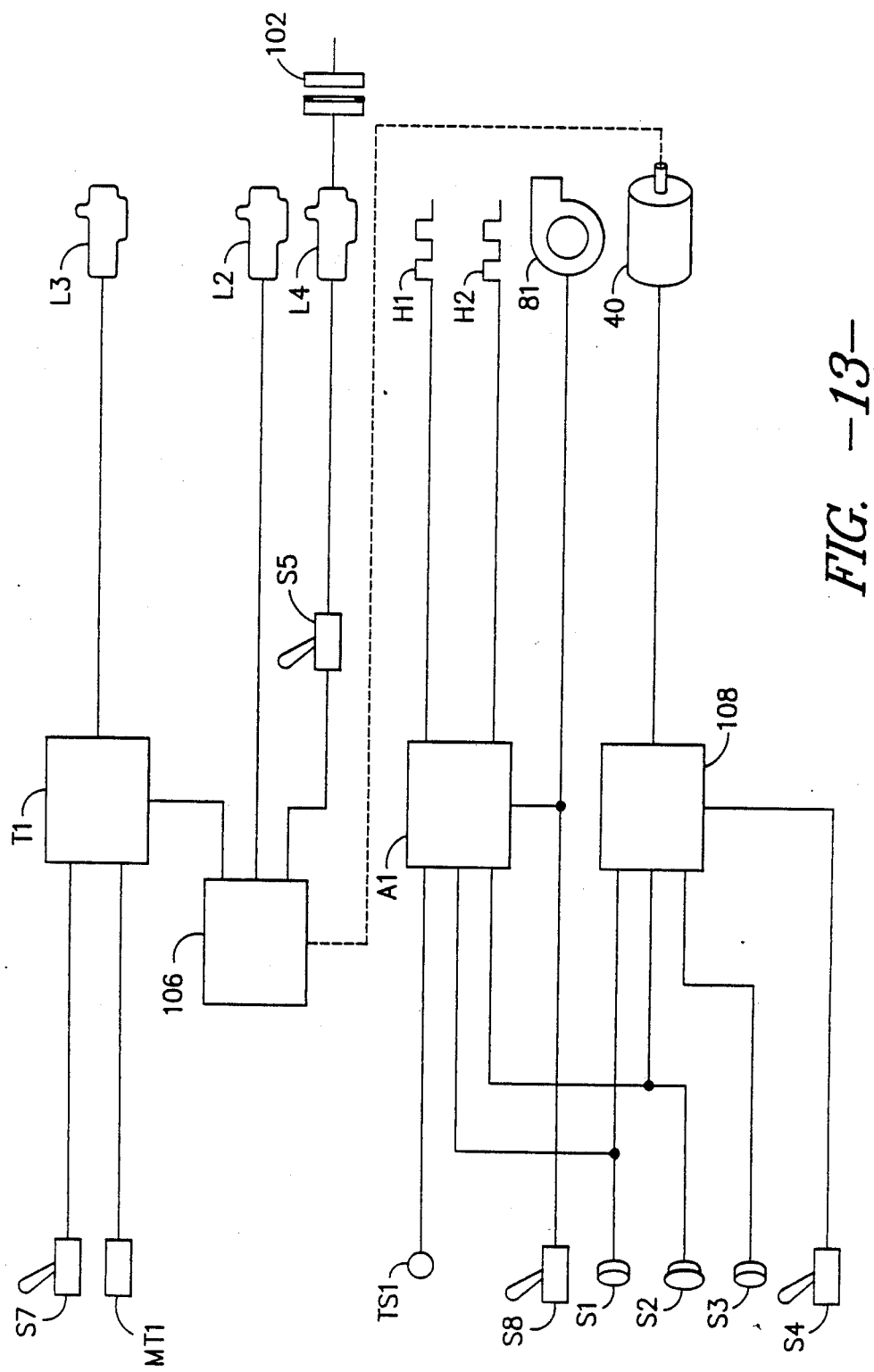
FIG. -13-

METHOD AND APPARATUS FOR SEALING CAPSULES CONTAINING MEDICAMENTS

The present invention is directed to method and apparatus for sealing capsules containing medicaments, and more particularly, to an improved method and apparatus for sealing the cap and body portions of medicament-containing gelatin capsules to improve medicament retention, capsule security, and tamper-resistance.

BACKGROUND OF THE INVENTION

Pharmaceutical compositions and medicaments typically are orally ingested in liquid, tablet, and capsule form. The gelatin capsule is a solid, oral dosage form of medicament generally consisting of two prefabricated cylindrical shells (a cap and a body), one end of each of which is rounded and closed, and the other end of which is open. A medicament or medicaments, usually in paste, liquid, or powder, are filled into the body which is then joined with a cap to close the capsule.

Historically, the hard gelatin capsule form of medication has been considered a preferred dosage form since patients perceive them as having no aftertaste, being easy to swallow, causing no indigestion, and working quickly. Although the gelatin capsule is a highly effective form of solid oral dosage for medications, recent events have focused attention on their security and tamper-resistance.

The standard gelatin capsule in which the smooth side wall of the body of the capsule is telescopically received within the smooth cylindrical side wall of the cap can be easily reopened after filling. One solution to prevent reopening after filling is to band the joined cap and body of each capsule at their seam of overlap with a gelatin band or film. This requires contact of each capsule by a liquid gelatin-coated roller to apply the band thereto, involves a time-consuming operation and costly apparatus, and is generally incompatible with high-speed capsule-filling machine operations.

As an alternative to capsule-banding to secure the cap and body portions, the smooth side walls of the cap and body of capsules have been shape-modified by provision of mating circular grooves and ridges to achieve a snap-fit securement of the cap and body to resist reopening after joining. Capsules having structurally-modified cap and body wall configurations are commercially available and sold by Capsugel Division of Warner Lambert Corporation under the trademarks Snap-Fit TM, Coni-Snap TM, and Coni-Snap Supro TM.

While shape-modified cap and body structures which provide snap-fit securement greatly reduce splitting and denting effects during capsule joining, and make capsules more difficult to open after joining, tamper-resistance and security of capsules may be further improved by sealing the caps to the bodies after filling. Various techniques have been employed in sealing hard gelatin capsules, such as immersion of the capsules in a liquid sealing composition, specific application of a sealing composition to the capsule, cap spraying, mechanical thermal welding, gelatin banding, and through-hole spraying.

The most effective sealing of capsules is believed achieved by using a sealing fluid that results in a one-piece gelatin capsule. One prior method for sealing hard gelatin capsules so that they cannot be opened without visible destruction is known as the Licaps TM sealing process developed by Capsugel. The Licaps TM process involves wetting the wall contact areas between the cap and body with a special melting point-lowering liquid. After removal of the excess wetting liquid from the capsule, the sections are then thermally bonded into one unit. To obtain a homogeneous seal, it is important that the wall contact areas be exposed uniformly to the wetting liquid, which is achieved through capillary action, causing the wetting liquid to be drawn into the area between the overlapping walls of the cap and body of the capsule.

The wetting liquids are believed to act to dissolve the amorphous part of the gelatin between the overlap of the cap side walls over the body side walls of the capsules by lowering the glass transition temperature of the gelatin. Furthermore, the sealing or wetting liquids may depress the melting point of the crystalline part of the gelatin. Such wetting liquids must be readily ingestible, available, affect a lowering of the gelatin melting point, and have a small contact angle with the capsule walls to promote high capillary action. A number of such wetting liquids and their methods of application to capsules are disclosed and described in U.S. Pat. No. 4,539,060 to Wittwer et al. and in co-pending U.S. patent application Ser. No. 06/582,364 filed February 22, 1984 now U.S. Pat. No. 4,656,066, both commonly-assigned with the present application. A highly suitable wetting liquid is a mixture of water and an alcohol, such as ethanol, two solvents which are frequently and commonly used in the manufacture of pharmaceutical products. The selection of the ratio of the liquid components of the wetting liquid depends upon the composition of the capsule wall (degree of moisture, presence of additives, such as dyes and pigments), the type of printing on the capsule, and the temperature during application of thermal energy. The disclosures of aforesaid U.S. Pat. No. 4,539,060 and pending U.S. patent application are incorporated herein by reference.

The Licaps TM capsule-sealing process is a three-step method involving a first liquid-contacting phase in which filled and closed gelatin capsules are brought into contact for a brief period of time with the wetting liquid, which is immediately distributed through capillary action into the area between the overlapping walls of the caps and bodies.

In the second step, or phase, excess wetting liquid is removed from the exposed outer walls of the conveyed capsules by mechanically draining and air-drying. The overlapping gelatin wall sections remain moist which causes the walls to swell, resulting in a homogeneous, though preliminary, seal between the cap and body.

In the third step, or phase, final and complete sealing is achieved by application of the specific amount of thermal energy to effect sealing.

Apparatus designed for practice of the Licaps TM sealing process consists of a sealing machine which may be linked by conveyor to receive filled capsules directly from a capsule-filling machine. The sealing machine comprises a rotating conical wire-mesh basket in which a wetting liquid is sprayed onto the entire outer surface of capsules as they are continuously fed therethrough. Capillary action causes transfer of some of the wetting liquid to the area between the overlapping walls of the cap and body of each capsule. The excess wetting liquid is removed from the capsules as they approach the exit end of the basket both by mechanical drainage and application of room-temperature air. From the liquid applicator basket, the capsules are directed alternately, in batch-wise manner, into one of two drying and sealing chambers which are in the form of fluidized beds. Since two chambers are available, the sealing machine operates to fill the chambers in alternating fashion, so that conditioned cool air is first passed through each chamber during capsule-filling to further dry the capsules, while heated air is thereafter passed through each chamber after it is filled to thermally seal the capsules. The excess wetting liquid, generally comprising a mixture of water and alcohol, which is removed from the capsules by drainage and evaporation, is eventually collected and processed by special recovery equipment to meet environmental regulations and requirements for disposal.

Although the Licaps ™ capsule-sealing process and apparatus, as described, provides an effective method and means to produce a one-piece capsule which may not be separated without destruction, it does require rather specialized equipment for conveying, spraying, handling, treating, and initially drying the capsules which involves a considerable capital investment. Further, the application of a wetting liquid to the entire capsule outer body surface involves use of excess chemicals and additional costs in the necessary equipment to collect and dispose of the excess wetting chemicals to meet environmental standards and regulations.

In the aforementioned U.S. Pat. No. 4,539,060 and the co-pending U.S. patent application, it has been suggested that wetting liquids of the type described might be applied locally to seam areas of gelatin capsules for migration between the overlapping cap and body by delivering metered quantities of the wetting liquid by high-frequency pulsation of jets or nozzles.

More recently filed, commonly assigned co-pending U.S. patent application Ser. No. 28,632 filed March 20, 1987 (now U.S. Pat. No. 4,724,019) and Ser. No. 065,456 filed June 22, 1987 (now abandoned), disclose and describe improved apparatus for use in sealing gelatin capsules having cylindrical cap and body portions arranged with the side walls of the bodies telescopically received within the side walls of the caps to contain a medicament. The apparatus comprises one or more generally tubular passageways the lower ends of which communicate with a supply of capsules, as with respective capsule-discharge outlets of a capsule-filling machine, to receive capsules discharged therefrom in cap-up position and direct them upwardly by means of pneumatic pressure differential to a fluid applicator. A passageway-blocking element holds each capsule against further movement while metered amounts of a wetting fluid are ejected from needle discharge outlets against the side wall of the body of the capsule to distribute wetting fluid by capillary action upwardly into the area between the telescoped walls of the cap and body. The blocking element is programmed to release each wetted capsule in the tubular passageway in an upward direction for delivery to a suitable heating device to seal the side walls of the cap and body of the wetted capsule. Although the device as described in said co-pending applications operates to effectively supply metered amounts of wetting fluid to capsules in a capsule-sealing operation, the capsules must be delivered to the tubular passageways in a precisely oriented position, i.e., with their caps up in the direction of movement of the capsules through the tubular capsule conveying passageway to the wetting fluid applicator. In addition, upward application and movement of the wetting fluid between the side walls of the capsules to pass between the walls of the cap and body necessarily operates against the influence of gravity which otherwise might aid in the movement of the wetting fluid to proper position between the side walls of the cap and body of the capsule.

Devices for orienting such medicinal capsules for delivery to a printing station of a capsule-printing device are well known, and are described variously in U.S. Pat. Nos. 4,266,477; 4,327,825; and 4,372,437. Certain of such capsule-orienting devices as described in the aforesaid patents employ a rotating drum, or cylinder, having peripheral, radially disposed pockets for receiving capsules from a capsule-supply, such as a hopper. The capsules are generally received in the pockets of the cylinder in an upright, vertical position, may be held by vacuum in the pockets, and during rotation of the cylinder about its central axis, the capsules are reoriented by suitable means, such as mechanical elements, gravity, pneumatic pressure, or combinations of the same to deliver the capsules in "rectified" conditions, i.e., with their cap portions all oriented in the same direction, for subsequent delivery to a printing station.

Capsules have also been conveyed on endless "belt-type" conveyors in which the capsules are supported between adjacent, parallel rotating support rods which form the surface of the conveyors and rotate the capsules during their linear transport for visual inspection.

Apparatus is also known for orienting capsules in their movement from a capsule-supply point, such as a hopper, to a position for filling with medicine. Such apparatus is manufactured and sold as GKF Capsule Filling Machine by Robert Bosch GmbH of West Germany. The capsule-orienting section of the apparatus generally comprises a plurality of vertical passageways communicating with a hopper for gravitationally receiving the capsules in random cap-up or cap-down orientation for delivery to orienting stations. Each orienting station comprises a pair of side wall members which are so spaced as to frictionally engage and hold the side wall of the cap of the capsules without frictionally holding the side wall of the body of the capsule. Pusher mechanisms are employed at each station to reorient the capsules by rotation about axes perpendicular to their longitudinal axis to position the capsules in a cap-up position for discharge to a capsule-filling station.

BRIEF OBJECTS OF THE PRESENT INVENTION

It is an object of the present invention to provide an improved method of sealing gelatin capsules containing medicaments and pharmaceutical compositions by controlled application of small, metered amounts of a wetting fluid between the overlapping side walls of the cap and body of the capsules to produce a one-piece capsule which cannot be opened without destruction of the capsule body or cap.

It is another object of the present invention to provide improved automated apparatus used in sealing hard gelatin capsules containing a medicament by application of metered amounts of a wetting fluid to fuse overlapping wall area of the cap and body of the capsules to effectively seal the same against removal.

It is a more specific object to provide improved method and apparatus for effectively sealing the cap and body of gelatin capsules to prevent their removal to ensure positive retention of medicaments therein wherein the capsules randomly oriented in a capsule supply hopper are reoriented and delivered sequentially to a capsule-wetting station in a vertical, cap-down orientation where metered amounts of wetting liquid are applied thereto by capillary and gravitational influence to reside between the overlapping side walls of the cap and body of the capsules, and the wetted capsules are thereafter delivered for drying and heat treatment to seal the capsules.

It is still another object to provide improved method and apparatus of the type described wherein capsules from a capsule supply are wetted with a wetting liquid and thereafter conveyed to a discharge point while being heated to effectively seal the same.

SUMMARY OF THE INVENTION

The present invention is directed to method and apparatus for continuously sealing capules containing medicaments to resist separation of the cap and body portions of the capsules wherein medicament-containing capsules from a supply source are continuously delivered in end-wise abuttment along one or more paths of travel in which the capsules are oriented into a generally vertical, cap-down position and wetted with a suitable wetting fluid at the seam of the juncture of their caps and bodies to locate the wetting fluid between the overlapping side walls of their caps and bodies. The wetted capsules are delivered to a drying zone where the moving capsules are dried of excess wetting fluid, and are thereafter delivered to a heating zone where the moving capsules are heated to seal their caps and bodies before discharge to a collection point.

More specifically, capsules from a supply hopper are directed through one or more passageways to rectification stations where they are rotated about axes perpendicular to their longitudinal axes for delivery, in cap-down orientation, to a wetting station. After wetting with a suitable sealing agent, the capsules are transported in peripheral pockets of a rotating drum while air is passed around the capsules to dry the capsules. The rotating drum delivers the capsules onto a multiple rod, endless conveyor which conveys the capsules, while rotating them about their longitudinal axes, through a heating chamber to heat and seal the same.

BRIEF DESCRIPTION OF THE DRAWINGS

The above, as well as other objects of the present invention will become more apparent, and the invention will be better understood, from the following detailed description thereof, and by reference to the accompanying drawings, in which:

FIG. 1 is a side elevation view of a capsule-sealing machine of the present invention for continuously sealing cap and body portions of capsules containing medicament therein;

FIG. 2 is a right end elevation view of the machine as seen in FIG. 1;

FIG. 3 is an enlarged sectional elevation view of the machine, taken generally along line III—III of FIG. 2, and looking in the direction of the arrows;

FIGS. 4–7 are enlarged, broken away, side sectional elevation views of one capsule-orientation station of the rectification section of the machine, showing in sequence, the manner in which randomly oriented capsules directed to each station are reoriented to deliver them to the wetting stations of the machine in a vertical cap-down orientation;

FIG. 8 is an enlarged right end elevation view of a broken away portion of four adjacent orientation stations the rectification section, looking the direction of the arrow VIII—VIII in FIG. 5, showing four adjacent capsule-orientation stations of the machine;

FIG. 9 is a plan view of the capsule-orientation stations seen in FIG. 8;

FIG. 10 is an enlarged broken away, sectional elevation view of a lower portion of the sealing machine as seen in FIG. 3, showing the wetting section, rotary drum dryer, and portion of the capsule-heating conveyor of the machine;

FIG. 11 is a sectional view of the rotary drum dryer and a portion of the adjacent heating conveyor, taken generally along line XI—XI of FIG. 10, looking in the direction of the arrows;

FIG. 12 is an enlarged sectional elevation view of the capsule supply hopper, as also seen in FIG. 3; and FIG. 13 is a schematic diagram illustrating the major control and power components for operation of the capsule sealing machine of FIGS. 1-12.

DETAILED DESCRIPTION OF PREFERRED EMBODIMENTS

Referring more specifically to FIGS. 1 and 2 of the drawings, the capsule sealing machine 10 of the present invention generally comprises a support frame 11 on which is mounted a capsule supply hopper 12, a first capsule delivery section 14, a capsule rectification section 16, a rectified-capsule delivery section 18, a capsule wetting section 20, a rotary drum capsule dryer 22, and a capsule-heating conveyor 24.

In operation, randomly oriented medicinal capsules C in capsule supply hopper 12 are continuously delivered into a plurality of side-by-side capsule guide passageways 26 (FIGS. 2 and 3) of the first capsule delivery section 14. Capsules C pass downwardly in passageways 26 by gravity, in endwise abutment, and in either cap-down or body-down orientation, depending upon their introduction from the hopper 12.

Capsules from each of the passageways 26 of delivery section 14 are directed to respective capsule-orientation stations of rectification section 16 where they each are rotated about axes perpendicular to their longitudinal axis to pass into and through corresponding passageways of the rectified-capsule delivery section 18 all in a cap-down orientation. Located at the bottom of each passageway of delivery section 18 is an individual wetting station of wetting section 20. At each wetting station, a suitable sealing liquid, such as an alcohol/water solution, is applied to the individual capsules at the seam of their body and cap portions to locate liquid between the lapping wall portions of the cap and body. The wetted capsules are thereafter delivered by the rotary drum dryer 22 onto conveyor 24 where the capsules are heated by convection and conduction to seal their capsule cap and body portions. Sealed capsules leaving the heating conveyor are discharged to a point of collection.

As best seen in FIGS. 2, 3, and 12, capsule delivery section 14 is formed of a back plate 28 and front plates 29 which have a plurality of parallel vertical channels therein. Plates 28 and 29 extend across the machine and are attached to form between them the capsule guide passageways 26 (FIG. 2). The upper end of delivery section 14 extends into the lower end of supply hopper 12 (FIGS. 3 and 12) and reciprocates vertically into the hopper to facilitate introduction of capsules C into passageways 26. Located at the lower ends of the passageways 26 of delivery section 14 are a plurality of stop fingers 30 (FIGS. 2, 3, and 4–7) which are mounted for pivotal movement on a common shaft 31 which extends across the delivery section. The individual stop fingers 30 communicate with the ends of the capsule guide passageways 26 (FIGS. 3–7) and, during downward reciprocation of delivery section 14, a spring-biased cam member 32 on the end of shaft 31 engages a cam activator 34 on the machine frame 11 to move shaft 31 and pivot the fingers 30 out of the passageways 26, thus simultaneously releasing a capsule from the end of each of the individual passageways 26.

Capsule delivery section 14 is mounted for vertical reciprocation along vertical supporting rods on each side of the machine frame, one of which, 38, is shown in FIG. 3. The section is vertically reciprocated by means of a central drive motor 40 (FIG. 1) which is operatively connected by a timing belt 41 to a rotatable shaft 42. Eccentricly mounted on drive shaft 42 (FIG. 3) is a drive rod 44 which is operatively connected by a rocker arm 46 to the center portion of delivery section 14. The rocker arm 46 is mounted for pivotal reciprocating movement on a support shaft 48, and a roller 49 on one end of the rocker arm is located for movement between guide blocks 54 on delivery section 14.

Located directly below the discharge end of each passageway 26 of delivery section 14 is a capsule orientation station of capsule-rectification section 16. As best seen in FIGS. 3–9, which show an individual orientation station of the section, each station includes a capsule-receiving chamber 56 into which individual capsules C are delivered from its capsule passageway 26. Each chamber 56 is formed by parallel, spaced vertical side walls 58 formed in an elongated cross bar 57, a shim plate 59, and a vertical finger-like protrusion 60 of the front plate 29 of delivery section 14. The walls 58, shim plate 59 and protrusions 60 temporarily support an individual capsule C in an upright position (FIG. 4) in each chamber 56, with the longitudinal axes of the capsule substantially vertical. Located directly in front of each capsule-receiving chamber 56 on a level therewith is a capsule-holding area which is formed by spaced parallel blocks 61 having side walls, the distances between which are adjustable by shim plates 59 to frictionally engage and hold the larger diameter cap portion of each capsule without contacting the smaller diameter body portion of the capsule.

As illustrated in FIGS. 4–7, individual capsules C in each chamber 56 are simultaneously introduced into their respective capsule-holding area between the spaced parallel walls of the blocks 61 by a plurality of pusher fingers 63. Fingers 63 are supported across the machine on a long support plate 64 which is mounted for horizontal reciprocation on rods, one of which 64a is shown in FIG. 3. Plate 64 is attached operatively to the end of rocker arm 46 by a roller 65 which rides in guide blocks 66.

As seen in sequence in FIGS. 4–6, pusher fingers 63 move horizontally into the capsule-receiving chambers 56 during upward movement of delivery section 14 to strike the upright capsules C, in either cap-up (FIG. 5) or cap-down (FIG. 7) orientation, at approximate midpoints of their length. Further horizontal forward movement of the pusher fingers 63 push the capsules from their receiving chambers 56 into their respective capsule-holding areas (FIG. 6). As the capsules are pushed into their holding areas, their cap portions are frictionally engaged by the opposed, spaced walls of plates 61 to retard their horizontal movement across the holding area (FIGS. 5 and 7), causing rotation of each capsule about an axis perpendicular to its longitudinal axis. Because the caps of the capsules are restrained by frictional engagement with the side walls of the opposed blocks 61, the body portions of the capsules C are pushed forwardly ahead of their caps by fingers 63 to dispose the capsules C in a generally horizontal position in the holding areas (FIG. 6). The pusher fingers 63 then reciprocate in horizontal direction and retract from the holding areas as the capsule-delivery section 14 moves downwardly (FIG. 4).

Mounted on the front of delivery section 14 are a second plurality of capsule pusher fingers 67 with points 67a which move vertically downward to initially contact the cap portion of each capsule in its holding area (FIG. 6) and push the cap portion of the horizontally disposed capsule downwardly. The capsules are thus rotated about an axis transverse to their longitudinal axis into a full, cap-down position in the holding area. Further downward movement of the vertically reciprocable pusher fingers 67 pushes the capsules out of contact with side walls of the plates 61 (FIG. 4) and the capsules fall, by gravity, in cap-down orientation, into the rectified-capsule delivery section 18 of the machine.

Capsules in the rectified-capsule delivery section 18, which extends across machine 10, are guided in cap-down, endwise abutment through plural parallel passageways 68 in the section. As best seen in FIGS. 3 and 10, located at the lower ends of passageways 68 immediately adjacent the upper surface of the rotary drum dryer 22 is the capsule wetting section 20. Individual capsules in each of the passageways are stopped at the individual wetting stations of the wetting section by engagement of their lower cap ends with the upper peripheral surface of the rotary drum dryer 22. As seen in FIG. 10, each wetting station has a pair of fluid ejection needles 70 having outlets located on opposite sides of the capsule C immediately adjacent the seam of juncture of its cap and body portions. Each needle is connected by a suitable conduit 72 to a wetting liquid supply source (not shown). Upon actuation by suitable programming means operatively connected to the power supply components of the sealing machine, a metered amount of wetting liquid is ejected against the side walls of the capsules adjacent their cap and body seam to pass by capillary action and gravity into the space between the cap and body side walls. The application of wetting liquid is sequenced to take place when the capsules are supported in the wetting stations, in cap-down position, with their cap-ends supported on the peripheral surface of the rotating drum 22.

As best seen in FIGS. 10 and 11, the surface of rotary drum dryer 22 has rows of capsule-receiving pockets 74 disposed in circumferential and axial alignment. Each circumferential row is aligned with the outlet of a respective wetting station. As the drum rotates, and after wetting, the wetted capsules engaging the surface of the drum drop from their respective wetting stations into pockets 74 of the drum and are conveyed for approximately 180° of drum movement, as best seen in FIG. 10. Located inside the drum is a vacuum manifold 76 which communicates with a suitable vacuum source, such as an air fan blower 77, by way of conduits 80 which communicate with each end of the drum. Vacuum manifold 76 also communicates with each of the drum pockets 74 over approximately 180° of rotation of the drum to draw air into the pockets around the capsules and dry the same, and moisture and liquid are removed from the drying air by a liquid sumptrap 78.

As seen in FIG. 11, capsules in the pockets of the drying drum are discharged from the pockets at their lowermost point of arcuate travel by means of a plurality of elongated capsule ejector plates 82, each of which is carried in the drum and extends across the width of the drum through an axially aligned row of pockets. Each ejector plate 82 has a cammed edge 82a and a spring 83 which biases it at one end for movement in its row of pockets parallel to the axis of drum rotation. Suitable activator means, shown as a pneumatic piston 84, is programmed to strike the end of each ejector plate as it reaches the capsule discharge position and push it along the axis of the drum against the force of its spring 83, causing the capsules in the pockets served by the ejector plate to ride up the cammed edge 82a of the ejector plate and be pushed out of the pockets 74.

To facilitate transfer of the dried capsules from the pockets 74 of the drum onto the capsule heating conveyor 24, a guide plate 87 extending along the length of the drum directly below the drum has angled edge surfaces 87a adjacent each row of drum pockets 74 to direct the ends of the capsules in a common sideways direction parallel to the axis of rotation of the drum and the axis of rotation of conveying rods 88 of the heating conveyor 24. To further facilitate placement of the capsules from the drying drum onto the heating conveyor, the longitudinal axis of the pockets of the drum may be tilted at a suitable angle, such as 15°, to the drum radius in a direction parallel to the axis of drum rotation, as seen in FIG. 11.

As best seen in FIGS. 1, 2, and 10, heating conveyor 24 includes a housing 89 enclosing an endless belt of parallel metal rods 88 mounted for linear movement and for rotation during linear movement on endless drive chains 90 (FIGS. 1 and 11). Drive chains 90 are mounted on drive sprockets 92 of support shafts 94. The rods 88 support the capsules in the valleys between adjacent rods. During movement of the conveyor, the circumferential end surfaces of the supporting rods frictionally contact and are rotated by upper horizontal edge surfaces 95 (FIG. 11) of the housing and correspondingly rotate the capsules during the heating operation. Manifolds 96 (FIGS. 1 and 2) located on opposite sides of the conveyor along its length are connected by conduits 98 to a source of heated air, shown as heater 99 and air blower 81, and heated air is supplied to the heating conveyor housing 89 as the capsules move therethrough. Heating air may be recirculated to the air blower 81 through return conduit 100. Thus, the capsules are heated to seal the capsule body and cap portions by convection air and by conduction heat from the metal rods 88. Capsules leaving the heating conveyor are discharged by means of suitable discharge chute to a source of collection.

Operation of the capsule-sealing machine of the present invention may be best described by reference to FIGS. 1, 3, and 13. Power for operating the first capsule-delivery section 14, the orienting fingers 63, 67 of the rectification section 16, the drying drum 22, and the heating conveyor 24 may be supplied from common drive motor 40. The output shaft of drive motor 40 is connected by a timing belt 41 to the drive pulley 42a of shaft 42 which is connected by a clutch mechanism 102 (FIG. 13) to the eccentrically mounted drive rod 44. Timing belt 41 is also operatively connected to a drive pulley 104 which is drivingly connected to support shaft 94 of the heating conveyor. Shaft 94 carries support sprockets 92 of the heating conveyor 24 and is drivingly connected by gears 22a, 22b to the drying drum 22 (FIG. 11). Thus, rotation of drive motor 40 synchronously moves the several capsule-conveying and rectifying sections of the machine 10.

The drive shaft of motor 40 also is operatively connected to an electronic cam box 106, such as may be manufactured by Electro Cam Corporation (Model EC 200412DLN) of Roscoe, Illinois. Cam box 106 actuates, by electrical signal through a progamable timer, the sequence of application of wetting liquid to the capsules at the capsule-wetting station 20.

As seen in FIG. 13, which is a schematic diagram of the main control and power components of the machine 10, start and stop switches S1 and S2 located on a control panel (not shown) are operated to supply AC power to all controls of the machine, including the drive motor 40. Drive motor 40 is operated by a Jog push-button S3 or run-switch S4. Power is supplied to the main drive motor through a conventional motor speed control unit 108, such as may be manufactured by Bodine Corp. Wetting spray from the wetting station needles 70 are controlled by a programable timer T1, such as a model LIBT 2000 manufactured by Red Lion, which has two adjustable set points and is connected to operate valving of a suitable pressurized wetting liquid supply source. The first set point determines when the spray begins and the second set point determines the duration of the spraying. The timed cycle of spray is synchronized by a signal from the cam box 106 which is coupled to the main drive motor 40. The spray is also controlled by a spray switch S7, and a feed sensor, such as as proximity switch MT1 located at a suitable point on the frame of the machine adjacent the reciprocating capsule-delivery section 14. The spray switch S7 must be turned on and the capsule feed sensor enabled before a spray solenoid (L3) will operate.

The temperature of the heating conveyor may be controlled by two heaters, an auxiliary heater H1 which is actuated by a low alarm circuit of a temperature controller A1, and which comes on when the unit is first powered. After the air temperature rises above the low alarm circuit set point, the temperature is controlled by a main heater H2. The temperature control uses a PID algorithm to maintain a constant air temperature, which is sensed by a thermocouple TS1 located in the air conduits. Both heaters are interlocked through a fan switch S8, preventing them from coming on when the blower fan 81 is turned off.

Ejection piston 84 located on the frame of the machine adjacent the lower surface of the conveyor is provided to eject capsules from the drum, and is synchronized by a signal from the cam box 106 by way of ejector solenoid L2.

Clutch 102 is provided through switch S5 to start and stop the capsule feed mechanism in conjunction with a timing signal generated by the cam box. When the clutch signal is turned on or off, the clutch engages or disengages on the next signal from the cam box by way of a clutch solenoid L4.

That which is claimed is:

1. A method of sealing gelatin capsules, each having a generally cylindrical cap and body arranged with the side wall of the body telescopically received within the side wall of the cap to contain a medicament therein, comprising the steps of moving a plurality of capsules in longitudinal endwise abutment along a path of travel for treatment with the capsules initially positioned randomly cap-first and body-first in their direction of movement, sequentially orienting each capsule in the path to position the capsule with its longitudinal axis substantially vertical and cap down, applying a metered amount of a wetting fluid against the side wall of the body of each capsule adjacent the seam of the juncture of the side walls of its body and cap to distribute wetting fluid by capillary action and under influence of gravity into the area between the telescoped walls of the cap and body, and delivering each wetted capsule along the path for further treatment.

2. A method as defined in claim 1 including the steps of subsequently conveying each wetted capsule in a generally arcuate path of travel while directing a stream of air around the capsules to remove excess wetting fluid therefrom, directing the air-stream-treated capsules from the arcuate path of travel in a linear path of travel, and heating the capsules in the linear path of travel to seal the side walls of the cap and body of each capsule.

3. A method as defined in claim 2 wherein the wetted capsules are conveyed in the arcuate path of travel by gravitationally delivering the capsules into radially disposed, capsule-receiving pockets on the surface of a rotating drum, and creating a pressure differential across the capsule-receiving pockets to direct the stream of air around the capsules to remove excess wetting fluid therefrom.

4. A method as defined in claim 3 wherein the pressure differential is created by drawing air through the capsule-receiving pockets radially inwardly of the drum.

5. A method as defined in claim 3 wherein the air stream-treated capsules are discharged from pockets of the rotating drum with their longitudinal axes disposed perpendicular to the direction of movement of the linear path of travel, and wherein the capsules are rotated about their longitudinal axis during their heating in the linear path of travel.

6. A method as defined in claim 5 wherein the capsules are supported in their linear path of travel for heating by a plurality of parallel, closely spaced rotating support rods, are located in the spaces between the rods, and are rotated about their longitudinal axes by frictionally engagement with the surface of the rotating support rods.

7. Apparatus for sealing gelatin capsules, each having a generally cylindrical cap and body arranged with the side wall of the body telescopically received within the side wall of the cap to contain a medicament therein, comprising means for delivering a plurality of capsules in longitudinal endwise abutment randomly cap-first and body-first along a predetermined path of travel, capsule-orienting means in the path of travel for sequentially holding each capsule during its movement along said path, and for orienting each held capsule to position the capsule with its longitudinal axis substantially vertical with cap down, wetting means for applying a metered amount of a wetting fluid against the side wall of the body of each held capsule adjacent the seam of the juncture of the side walls of its body and cap to distribute wetting fluid by capillary action and under influence of gravity into the area between the telescoped walls of the cap and body, and means for delivering each wetted capsule from the wetting means along the path of travel for further treatment.

8. Apparatus as defined in claim 7, wherein said orienting means includes first pusher means for positioning each capsule with its longitudinal axis substantially horizontal, and second pusher means for repositioning the horizontally disposed capsule with its longitudinal axis substantially vertical and with the cap of the capsule down.

9. Apparatus as defined in claim 7 wherein the means for delivering capsules along the predetermined path of travel includes a hopper for containing a plurality of capsules, first elongated passageway-defining means communicating with the hopper for gravitationally delivering capsules in endwise abutting relation randomly cap-first and body-first to the capsule orienting means, second elongated passageway-defining means for gravitationally delivering capsules from said capsule-orienting means to said wetting means; and wherein said capsule-orienting means includes parallel, spaced wall members having opposed wall surfaces for engaging side walls of the capsules, the wall surfaces of the side wall members being spaced a distance apart to frictionally engage and hold the side wall of the cap of each capsule while allowing the side wall of the body of the capsule to pass therebetween without frictionally holding the same, and pusher means for engaging each held capsule to rotate it about an axis perpendicular to its longitudinal axis to position it cap-first in direction of movement along the path of travel.

10. Apparatus as defined in claim 7 wherein said means for delivering each wetting capsule for further treament includes rotary drum means having a peripheral surface positioned in the path of travel for engaging the cap end of each capsule at said wetting means to positionally support the capsule during application of wetting fluid thereto, said drum means having a plurality of peripherally spaced, radially disposed pockets for gravitationally receiving and conveying wetted capsules from the wetting means during rotation of the surface of the drum means, thereby and means for producing a stream of air around the capsules during their conveyance in the pockets of the drum means to remove excess wetting fluid therefrom.

11. Apparatus as defined in claim 10 including capsule-heating means positioned adjacent the lower surface of the rotatary drum means for receiving capsules thereon, said heating means including an endless conveyor having a plurality of parallel, closely spaced rods for supportably receiving and conveying the capsules in spaces between adjacent rods, and means for rotating the rods during linear conveyance of the capsules to correspondingly rotate the capsules supported therebetween; and means for heating the capsules as they are conveyed on the rotating rods to seal the caps and bodies thereof.

12. An apparatus as defined in claim 11 wherein is said rotary drum means includes capsule-ejector means for discharging capsules from peripherally spaced, radially disposed pockets onto spaced rods of the endless conveyor in a direction such that the longitudinal axis of the capsules are parallel to longitudinal axes of the spaced rods to facilitate proper location of the capsules for supporting the space between adjacent rods, said ejector means including a guide bar positioned beneath the lower surface of the rotary drum means for engaging the capsules to direct their longitudinal axes in direction parallel to the longitudial axes of the support rods.

13. An apparatus as defined in claim 12 wherein said capsule-heating means includes a heating compartment having a heated air distributing manifold extending alongside the endless conveyor for directing heated air into the compartment and around the capsule support rods for heating the capsules to seal the caps and bodies of the same.

* * * * *